United States Patent
Yamanaka (10) Patent No.: US 9,243,779 B2
(45) Date of Patent: Jan. 26, 2016

(54) MULTI-DISPLAY SYSTEM AND TRANSLUCENT COVER USED THEREBY

(75) Inventor: Shigetsugu Yamanaka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/981,394

(22) PCT Filed: Jan. 26, 2012

(86) PCT No.: PCT/JP2012/051706
§ 371 (c)(1),
(2), (4) Date: Jul. 24, 2013

(87) PCT Pub. No.: WO2012/102349
PCT Pub. Date: Aug. 2, 2012

(65) Prior Publication Data
US 2013/0301263 A1   Nov. 14, 2013

(30) Foreign Application Priority Data
Jan. 27, 2011   (JP) ................................. 2011-014760

(51) Int. Cl.
*F21V 7/04*      (2006.01)
*F21V 11/00*     (2015.01)
(Continued)

(52) U.S. Cl.
CPC .......... *F21V 11/00* (2013.01); *G02F 1/133526* (2013.01); *G09F 9/35* (2013.01); *G02F 1/13336* (2013.01); *G02F 2001/133331* (2013.01)

(58) Field of Classification Search
CPC ............. F21V 11/00; G02F 1/00; G09F 9/35; G09F 13/00
USPC ................................................ 362/612, 227
See application file for complete search history.

(56) References Cited

U.S. PATENT DOCUMENTS 6,483,482 B1   11/2002 Kim
2004/0051944 A1   3/2004 Stark
(Continued)

FOREIGN PATENT DOCUMENTS

JP   61-204678 A   9/1986
JP   2-123989 U   10/1990
(Continued)

OTHER PUBLICATIONS

Official Communication issued in International Patent Application No. PCT/JP2012/051706, mailed on Mar. 13, 2012.
(Continued)

*Primary Examiner* — Diane Lee
*Assistant Examiner* — Omar Rojas Cadima
(74) *Attorney, Agent, or Firm* — Keating & Bennett, LLP (57) ABSTRACT

A multi display system (10) includes a plurality of display panels (100) disposed adjacently to each other via a boundary portion (20), and a translucent cover (113) disposed on the plurality of display panels (100). The translucent cover (113) is disposed so as to cover the boundary portion (20) and overlapping with both of the plurality of display panels (100) which are disposed adjacently. The translucent cover (113) is constituted by a supporting portion (113P) which covers at least part of the display panel excluding the boundary portion (20), and a portion which is continuous to the supporting portion (113P) and includes a concave portion (113C) formed on the observer side in a position facing the boundary portion (20).

8 Claims, 7 Drawing Sheets

(51) Int. Cl.
  *G09F 9/35* (2006.01)
  *G02F 1/1335* (2006.01)
  *B60Q 3/04* (2006.01)
  *G02F 1/1333* (2006.01)

(56) References Cited

U.S. PATENT DOCUMENTS

| | | | |
|---|---|---|---|
| 2006/0077544 A1* | 4/2006 | Stark | 359/448 |
| 2006/0145942 A1* | 7/2006 | Maatta | 345/1.3 |
| 2009/0059366 A1* | 3/2009 | Imai | 359/464 |
| 2010/0259566 A1 | 10/2010 | Watanabe | |
| 2011/0102302 A1 | 5/2011 | Watanabe et al. | |
| 2011/0279426 A1 | 11/2011 | Imamura et al. | |
| 2012/0008340 A1 | 1/2012 | Tomotoshi et al. | |
| 2012/0069273 A1 | 3/2012 | Watanabe | |

FOREIGN PATENT DOCUMENTS

| | | | |
|---|---|---|---|
| JP | 05-053514 A | | 3/1993 |
| JP | 05-188873 A * | | 7/1993 ... 345/48 |
| JP | 3070473 U | | 8/2000 |
| JP | 2001-005414 A | | 1/2001 |
| JP | 2002-140715 A | | 5/2002 |
| JP | 2003-098979 A | | 4/2003 |
| JP | 2003-157031 A | | 5/2003 |
| JP | WO 2009066436 A1 * | | 5/2009 |
| JP | WO 2010016194 A1 * | | 2/2010 |
| WO | 2008/149449 A1 | | 12/2008 |
| WO | 2009/066436 A1 | | 5/2009 |
| WO | 2009/157161 A1 | | 12/2009 |
| WO | 2010/106782 A1 | | 9/2010 |
| WO | 2010/137474 A1 | | 12/2010 |
| WO | 2010/140537 A1 | | 12/2010 |

OTHER PUBLICATIONS

English translation of Official Communication issued in corresponding International Application PCT/JP2012/051706, mailed on Aug. 8, 2013.

* cited by examiner

| | Panel 1 | | | | Joint | | | | | | Panel 2 | | | |
|---|---|---|---|---|---|---|---|---|---|---|---|---|---|---|
| Pixel coordinates | N+0 | N+1 | N+2 | N+3 | N+4 | N+5 | N+6 | M+6 | M+5 | M+4 | M+3 | M+2 | M+1 | M+0 |
| Display luminance | Y | Y | Y | Y | 0 | 0 | 0 | 0 | 0 | 0 | Y | Y | Y | Y |

(b)

| Pixel coordinates | n+0 | n+1 | n+2 | n+3 | n+4 | n+5 | n+6 | m+6 | m+5 | m+4 | m+3 | m+2 | m+1 | m+0 |
|---|---|---|---|---|---|---|---|---|---|---|---|---|---|---|
| Display luminance | Y | Y | aY | bY | 0 | 0 | 0 | 0 | 0 | 0 | bY | aY | Y | Y |

(c)

| Pixel coordinates | i+0 | i+1 | i+2 | i+3 | i+4 | m+4 | j+3 | j+2 | j+1 | j+0 |
|---|---|---|---|---|---|---|---|---|---|---|
| Display luminance | Y | Y | Y | Y | 0 | 0 | Y | Y | Y | Y |

MULTI-DISPLAY SYSTEM AND TRANSLUCENT COVER USED THEREBY

TECHNICAL FIELD

The present invention relates to a display device, and particularly to a multi display system constituted by a plurality of display devices.

BACKGROUND ART

A large size liquid crystal panel is utilized as a display device for amusement facilities, an information display, a digital signage, or the like. With the increase in variety of uses, it is tried to artificially realize a large screen display device by arranging a plurality of liquid crystal panels (sometimes referred to as a tiling technique). Such configuration is referred to as a multi display system or the like, and is paid attention to as a system for realizing a large screen with high definition.

However, in the multi display system, there occurs a problem that joints between a plurality of display panels are relatively noticeable. The problem will be described by way of an example of a liquid crystal display device.

A liquid crystal display device includes a liquid crystal display panel, a backlight unit, circuits for supplying various electrical signals to the liquid crystal display panel, a power supply, and a housing for accommodating them. The liquid crystal display panel has a display area in which a plurality of pixels are arranged, and a frame area around the display area.

The display area (an active area) is provided with pixel electrodes, TFTs, and the like, thereby displaying images, videos, and the like. On the other hand, the frame area is provided with a sealing portion for sticking substrates together so as to enclose liquid crystal materials between the substrates, wirings connected to gate electrodes and source electrodes of the TFTs, terminals for the connection to external driving circuits for inputting signals/scanning voltages, and the like. In order to prevent light leakage from the backlight, and to prevent the degradation of display quality in an outer circumferential portion of the active area caused by the disorder of alignment of liquid crystal molecules, a black mask (a light shielding member) is usually provided in the frame area. As described above, the frame area is an area which does not contribute to the display (an invalid display portion). The technique for narrowing the frame area of the liquid crystal display device is advanced year after year, but it is impossible to eliminate the frame area in principle.

In the multi display system, neighboring display panels are joined (coupled) on the outer edge side of bezels. Such a portion in which the bezel is disposed is also the invalid display portion. The region which does not contribute to the display around the active area is observed as a black frame between panel modules in the multi-panel configuration. For example, in the case where an image including a large object expanding over a plurality of panels is to be displayed, it is disadvantageously felt that the image quality of the entire multi-panel configuration is degraded due to the black frame.

In the multi display configuration utilizing a plurality of display panels, various methods for making the joints of the panel boundary portions less noticeable have been studied. For example, Patent Document No. 1 discloses, in order to display an image in which the joints are less noticeable on the whole multi panel display device, a configuration in which a translucent cover is provided on the observer side of the respective display panels.

A curved surface is formed in an edge portion on the observer side of the translucent cover. The curved surface portion functions as a lens. The curved surface portion (the lens portion) of the translucent cover is provided so as to cover the frame area of the display panel and a portion of the display area (a peripheral display area). The light emitted from pixels arranged in the peripheral display area is refracted in the lens portion. As a result, the image is observed so as to be displayed on part of the frame area. Accordingly, an image in which the joints are less noticeable can be displayed over the whole screen.

A method in which a projector is utilized, so as to perform display by combining a plurality of projected images is known in the technical field of VR (virtual reality) video technologies or the like. Patent Document No. 2 describes a projector which can obtain a screen with less noticeable boundary of divided images by superimposing a projected image on a portion corresponding to the joint of the divided images and by adjusting the luminance of the superimposed portion. As described above, in an end portion of the divided image, image signal processing which is different from that in the other portion is considered to be effective means. In this specification, in the multi display system, the image/picture displayed on each display panel is sometimes referred to as a divided image.

Patent Document No. 3 discloses a technique for making the joint of liquid crystal panels less noticeable by disposing a cylindrical lens between a light source and the panels in a position in the vicinity of the joint. In the display device described in Patent Document No. 3, the light from the light source is incident on an outermost edge portion of the liquid crystal panel via the cylindrical lens. The light passes through the pixels in the outermost edge portion, and thereafter reaches both sides of the position corresponding to the joint portion on the front panel, thereby forming a region with high luminance. In this way, a black rim or a black lattice pattern caused by the joint portion is made to be less noticeable.

In addition, Patent Document No. 4 shows a configuration in which a Fresnel lens is provided so as to cover the entire panel on the observer side of plasma display panels disposed adjacently. Herein, by means of the Fresnel lens, the projected images from the respective panels are displayed in an enlarged manner at the front of the respective panels. Accordingly, the observer can see the image as if the image also exists in the position corresponding to the joint of the panels.

CITATION LIST

Patent Literature

Patent Document No. 1: International Publication No. WO2010/140537
Patent Document No. 2: Japanese Laid-Open Patent Publication No. 2002-140715
Patent Document No. 3: Japanese Laid-Open Patent Publication No. 61-204678
Patent Document No. 4: Japanese Utility Model Registration Publication No. 3070473
Patent Document No. 5: Japanese Laid-Open Patent Publication No. 2003-98979

SUMMARY OF INVENTION

Technical Problem

In order to reduce the obstruction of display in the boundary portion, it is important to reduce the frame area in each panel, and to narrow the panel connecting structure. However, in order to form a narrow joint, it is necessary to reduce the distance from the active area to the edge of the housing in each panel. With such a configuration, the strength of the housing (bezel) which supports the panel is lowered, so that it is more difficult to hold the panel. In addition, the mechanical strength of the connecting portion of panels is weak, so that there is another problem that if a stress for warping the multi display configuration is applied to the display device, for example, the portion may easily be broken.

For such problems, Patent Document No. 5 discloses a technique for sticking an optical element such as a polarizing film onto liquid crystal panels so as to cover the joint of the liquid crystal panels. With such a configuration, the joint of the liquid crystal panels can be made less noticeable, and the joint can be reinforced. However, only sticking the polarizing film or the like is insufficient to attain the effect of making the joint less noticeable. Accordingly, the technique has such problems, in the multi display configuration, that the joint of display panels is made to be less noticeable, and that the mechanical strength in the joint of display panels is increased.

The present invention has been conducted so as to solve the above-mentioned problems, and the objective of the present invention is to provide a multi display system in which the joint (the boundary portion) of display panels is made to be less noticeable and the mechanical strength is improved in the case where the multi display system is configured by a plurality of display panels, and to provide a translucent cover used in the system.

Solution to Problem

The multi display system in one embodiment of the present invention includes: a plurality of display panels which are disposed adjacently to each other via a boundary portion; and a translucent cover provided on the plurality of display panels, for covering the boundary portion and overlapping with both of the plurality of display panels which are disposed adjacently to each other. The translucent cover is constituted by a supporting portion which covers at least part of the display panel other than the boundary portion, and a portion continuous to the supporting portion, the portion having a concave portion formed on the observer side in a position facing the boundary portion.

In one embodiment, each of the plurality of display panels includes a display area which contributes to display and a frame area provided around the display area. The boundary portion includes the frame area of each of the adjacent display panels, and part of light emitted from the display panel is emitted from an area corresponding to the boundary portion of the translucent cover in the concave portion.

In one embodiment, the concave portion covers at least part of the display area.

In one embodiment, the multi display system further includes a light diffusing layer or a reflection preventing layer formed on the translucent cover.

In one embodiment, the concave portion has a surface defined by two planes which are not parallel to each other.

In one embodiment, the concave portion has a surface defined by a curved surface.

In one embodiment, the concave portion has an asymmetric shape in the boundary portion.

In one embodiment, the display panel has a plurality of pixels, and to pixels close to the boundary portion, a display signal based on the information of image to be displayed in the boundary portion is applied.

In one embodiment, an observation direction of an observer is defined, and the shape of the concave portion is defined depending on the observation direction.

In one embodiment, an optical sensor is provided in the boundary portion.

The translucent cover of the present invention is a translucent cover used for a multi display system including a plurality of display panels each including a display area contributing to display and a frame area formed around the display area, the plurality of display panels being disposed adjacently to each other via a boundary portion. The translucent cover includes a concave portion disposed on the observer side of the display panel for covering the boundary portion between the display panels disposed adjacently and overlapping with both of the display panels in a position facing the boundary portion, and part of light emitted from the display panel is emitted from an area corresponding to the boundary portion of the translucent cover in the concave portion.

In this specification, the term of a display panel means a panel structure of minimum unit which has a display medium and which can control light used for display.

Advantageous Effects of Invention

According to the embodiments of the present invention, the joint of respective adjacent display panels in the multi display configuration can be made to be less noticeable. In addition, by disposing a translucent optical member so as to cover the boundary portion between adjacent display panels, it is possible to improve the mechanical strength.

DESCRIPTION OF EMBODIMENTS

Hereinafter embodiments of the present invention will be described, but the present invention is not limited to those described below.

(Embodiment 1)

Figure 1:
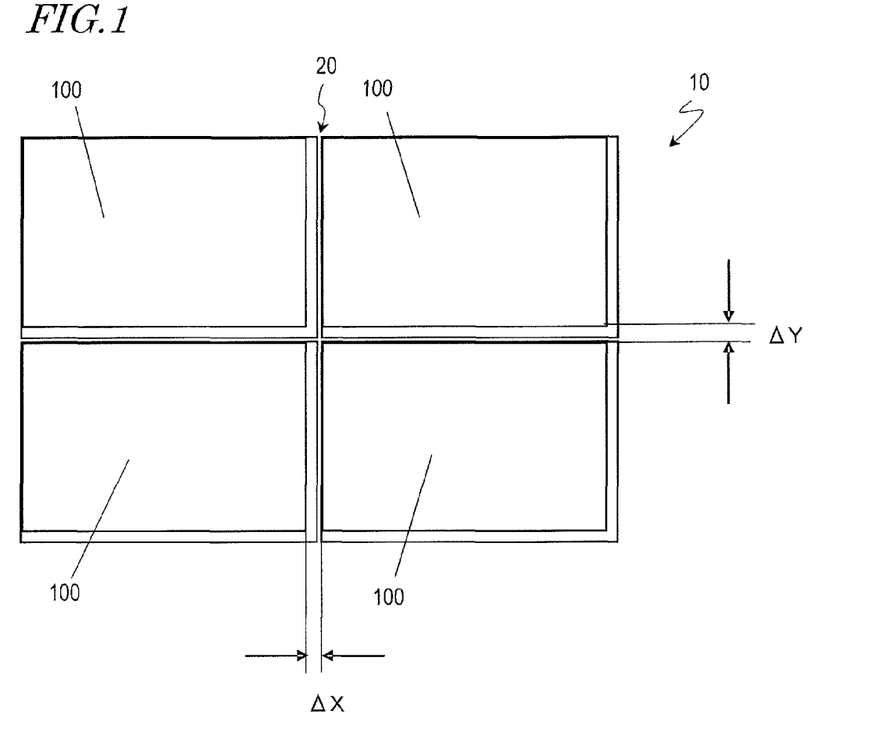
FIG. 1 is a schematic diagram showing the configuration of a multi display system in Embodiment 1 of the present invention.

FIG. 1 shows a multi display system (hereinafter sometimes referred to as a multi panel) 10 constituted by a plurality of liquid crystal panels 100. The multi display system 10 shown in the figure is constituted by four liquid crystal panels 100 which are disposed adjacently to each other in an arrangement of 2×2 in rows and columns. It is needless to say that the configuration of the multi display system 10 is not limited to the example shown in FIG. 1, but the multi display system 10 may be configured by using a larger number of liquid crystal panels 100 in such an arrangement of 4×4 in rows and columns. In addition, the liquid crystal panels 100 may not be necessarily arranged in a lattice like manner, but they may be arranged in such a manner that the panel pitches are shifted by half for each column (or each row).

In the multi display system 10, a joint 20 exists in a boundary portion (or a connecting portion) between two adjacent liquid crystal panels 100. In this specification, a portion which is formed between display areas of adjacent display panels (liquid crystal panels 100 in this embodiment) and which does not contribute to display including a frame area of each panel is referred to as a joint (or a boundary portion) 20. Typically, the joint 20 is formed in a lattice like manner along the outer edge of each liquid crystal panel 100.

Figure 2:
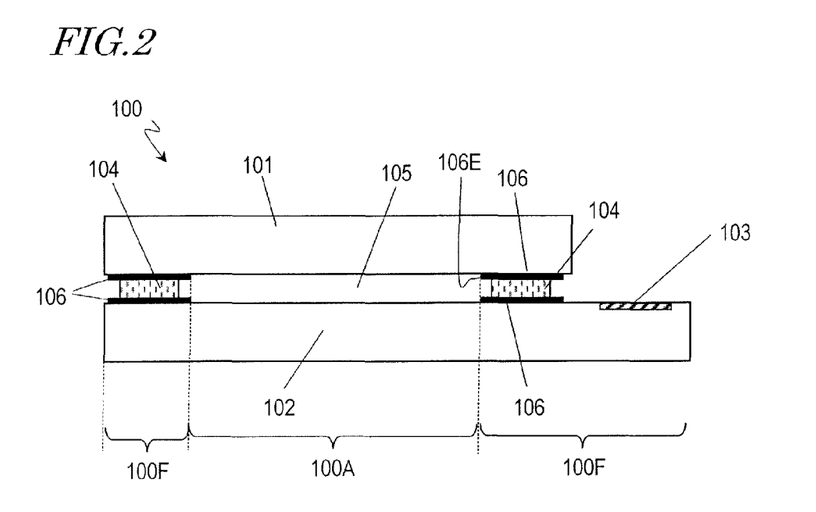
FIG. 2 is a sectional view showing a liquid crystal panel used in the multi display system in Embodiment 1 of the present invention.
Figure 3:
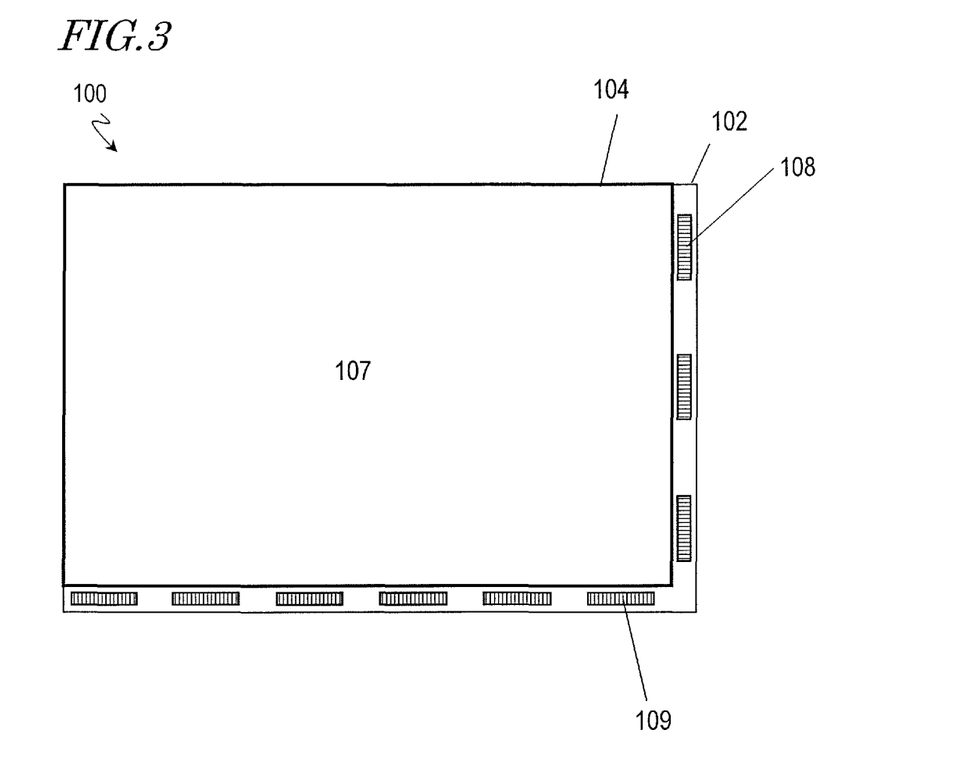
FIG. 3 is a plan view showing the liquid crystal panel used in the multi display system in Embodiment 1 of the present invention.

FIG. 2 and FIG. 3 show the configuration of each liquid crystal panel 100 shown in FIG. 1. In this embodiment, the liquid crystal panel 100 is a transmissive display panel which performs display by utilizing light from a backlight which is not shown, and a direct view type display device with a large screen can be obtained by adopting a multi display configuration.

The liquid crystal panel 100 includes a TFT substrate 102, a counter substrate 101, and a liquid crystal layer 105 interposed therebetween. The liquid crystal layer 105 is sealed by a sealing portion 104 between the paired and opposed substrates 101 and 102. In addition, in the liquid crystal panel 100, a display area (an active area) 100A and a frame area 100F disposed on the outer side of the display area 100A are defined.

On the TFT substrate 102, TFTs and pixel electrodes which are not shown in the figure are provided. On the counter electrode 101, for example, a color filter layer and a counter electrode (a common electrode) are provided. It is noted that the color filter layer may be provided on the side of the TFT substrate 102. In the case of a liquid crystal panel which is driven in lateral electric field mode such as IPS (In-Plane-Switching) mode, the counter electrode may not be provided. In addition, on the respective substrates 101 and 102, an optical element such as a polarizing plate or a retardation film may be provided.

In the liquid crystal panel 100, a light shielding layer (a black mask) 106 is provided between the sealing portion 104 and the TFT substrate 102 and between the sealing portion 104 and the counter substrate 101. The light shielding layer 106 has the function of preventing light leakage in an end portion of the liquid crystal panel 100, thereby improving the display quality in the circumferential portion of the display area 100A. In the vicinity of the sealing portion 104, the deterioration of display quality may easily occur due to the disorder of alignment of liquid crystal molecules. However, by the provision of the light shielding layer 106, undesired modulated light which is transmitted through the end region of the liquid crystal layer 105 can be prevented from reaching the eyes of the observer. By the edge 106E of the liquid shielding layer 106 on the side of the liquid crystal layer 105, the boundary between the display area 100A and the frame area 100F of the liquid crystal panels 100 can be defined.

In order to realize the narrowed frame, the light shielding layer 106 and the sealing portion 104 are often provided so as to overlap with each other, as described above. However, the configuration is not limited to such a configuration. Alternatively, the light shielding layer 106 may be provided on the inner side of the sealing portion 104 in the liquid crystal cell. In some cases such as that a photo-curable resin material is used as the sealing portion 104, the light shielding layer 106 may be provided only on either one of the counter substrate 101 or the TFT substrate 102 (typically only on the counter substrate 101). The light shielding layer 106 is, for example, formed by using a metal layer or a black resin layer.

In the display area 100A of the liquid crystal panel 100, a plurality of pixels are arranged in a matrix, for example. In FIG. 3, the display area 100A is shown as a pixel area 107. On the other hand, in the frame area 100F of the liquid crystal panel 100, the sealing portion 104 and connecting terminals 103 for the connection to a driving circuit or the like are provided. More specifically, the connecting terminals 103 include a gate terminal 108 and a source terminal 109 shown in FIG. 3. In this embodiment, the gate terminal 108 and the source terminal 109 are formed in a terminal area (typically in an expanded portion of the TFT substrate on the outer side of the liquid crystal cell) provided on respective one of the lengthwise sides and the crosswise sides, respectively, of the liquid crystal panel 100. To the connecting terminal 103, an FPC (a flexible printed circuit) 110 as an external driving circuit which will be described below is connected via a driving IC chip mounted by COG (chip on glass), for example.

Although not shown in the figure, on the back side (on the side opposite to the observer side) of the liquid crystal panel 100, a backlight and a light-guiding plate for guiding light from the backlight into the liquid crystal cell are provided. As the backlight, an LED or a CCFL can be used, for example.

The liquid crystal panel 100 which is described above may have the same configuration as that of a 60-inch liquid crystal display device (model number: PN-V601) available from the applicant of the present invention. The liquid crystal display device can be used for the multi display system. In the case where panels are arranged as shown in FIG. 1, the width of the non-display area (the joint 20) existing between the active areas of the adjacent liquid crystal panels 100 is set to be about 7.1 mm.

FIG. 1 is referred to again. In the multi display system 10, generally, when each liquid crystal panel 100 has an asymmetric configuration on the panel surface, the respective liquid crystal panels 100 are arranged in the same direction, and the joint 20 is formed between adjacent liquid crystal panels 100. The joint 20 includes the frame area 100F of each display panel 100, and may additionally include a panel holding structure for holding the liquid crystal panel 100 such as a bezel.

The boundary portion 20 of the liquid crystal panel 100 has no pixel, so that part of the image displayed on the entire multi display system 10 is missing in the portion. Accordingly, a lattice-like black frame is visually recognized as an image disturbance in the image of the whole display. As shown in the figure, the boundary portion 20 as the non-display area has a horizontal width ΔX and a vertical width ΔY, respectively. As the widths ΔX and ΔY increase, the observer may sometimes feel discomfort and may have foreign-body sensation for the contents of the image depending on the distance from the multi display system 10 to the observer.

Hereinafter the configuration of the panel border portion 20 of the multi display system 10 will be described more specifically.

Figure 4:
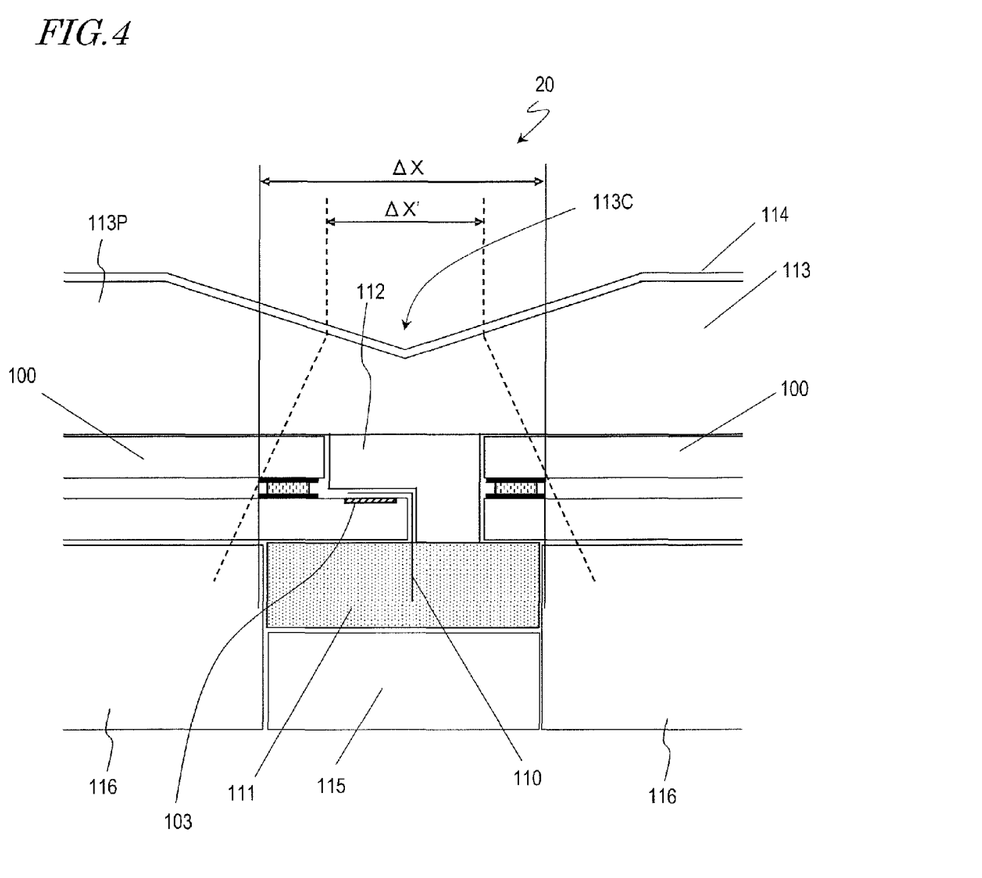
FIG. 4 is a sectional view showing the vicinity of a boundary portion (a joint) of liquid crystal panels in an enlarged manner in the multi display system in Embodiment 1 of the present invention.

FIG. 4 is a diagram showing the vicinity of the border portion (the joint) 20 between liquid crystal panels 100 which are disposed adjacently in an enlarged manner. In this embodiment, in the joint 20, a black mask 112 for making the joint 20 less noticeable is provided. The black mask 112 is formed from a black material, and more specifically, formed by using a resist containing a black pigment such as carbon black, low-level titanium oxide (titanium black), iron oxide, chromium, silver particle, or the like as a material, by photolithography.

In this embodiment, a translucent cover 113 is provided so as to cover the joint 20 and extend over the adjacent liquid crystal panels 100. The translucent cover 113 is configured by a plane portion 113P as a supporting portion, and a portion in which a concave portion 113C provided integrally with the flat portion is formed. The concave portion 113C is formed in a position corresponding to the joint 20. The thus configured translucent cover 113 has a function of reinforcing the joint 20 as a protecting member, and additionally has a function of refracting light emitted from the liquid crystal panel 100 as an optical lens in the concave portion 113C.

In the joint 20, on the back side of the liquid crystal panel 100, a connecter portion 111 is provided. In the connector portion 111, an FPC 110 which is crimped to the connecting terminal 103 of the liquid crystal panel 100 is connected to an expansion circuit board which is not shown. The FPC 110 and the connecting terminal 103 are crimped while the electrical conductivity is obtained via an anisotropic conductive film, for example. The connector portion 111 is formed, for example, by a connector housing of an engineering plastic such as PBT (polybutylene terephthalate), denatured PPE (polyphenylene ether), or PC (polycarbonate), or a resin material such as PS (polystyrene), and an electric connecting terminal. The connector portion 111 is fixed to a housing connecting portion 115. In addition, the housing connecting portion 115 of the joint 20 is configured by a translucent material, so that light from the adjacent backlight light guiding portion 116 can be transmitted.

As described above, in the border portion 20 of the multi display system 10 in this embodiment, the adjacent liquid crystal panels 100 are connected via the black mask 112 and are sandwiched and fixed between the translucent cover 113 and the connector portion 111. With such a configuration, the mechanical strength of the joint 20 is increased.

Next, the translucent cover 113 will be described in more detail. The translucent cover 113 is, for example, configured by an acrylic material with optical transparency, or the like. The thickness thereof is set to be, for example, about 1 mm to about 30 mm in a plane portion 113P. The thickness may be appropriately selected in accordance with the mechanical strength required for the joint 20. For example, the thickness may be determined in view of the size, the number, and the arrangement of the liquid crystal panels to be connected. However, in the border portion 20, it is necessary to form the concave portion 113C in the translucent cover 113. The depth of the concave portion 113C in the direction perpendicular to the panel related to the tilt angle of the concave portion 113C may be appropriately selected in accordance with the supposed distance from the display device to the observer. It is desirable that the thickness of the translucent cover 113 in the plane portion 113P may be about twice or more as large as the depth of the concave portion 113C.

In the joint 20, an inclined plane is provided in the translucent cover 113, and the concave portion 113C having a surface defined by two inclined planes which are not parallel to each other is formed. The translucent cover 113 having the concave portion 113C can be fabricated by, for example, mechanically cutting and grinding the surface of a translucent flat plate of acrylic resin or the like. In addition, the concave potion 113C having the optical lens function may be formed by giving a slope with a pressure partially applied to the portion in which the concave portion is to be formed, when the translucent cover 113 is fabricated from the translucent resin material.

In order to prevent the light from reflecting between the liquid crystal panel 100 and the translucent cover 113, it is preferred that the refractive indices of them be matched with each other. In many cases, the outer surface of the liquid crystal panel 100 is formed from a glass substrate, an optical film, or the like. Preferably, as the material of the translucent cover 113, a material having a refractive index in the same range as that of the glass or plastic of the substrate material is selected. The refractive index is set to be 1.30 to 1.64, for example. Generally, since the refractive index of the glass substrate for the liquid crystal panel is 1.51, in the case where the acrylic resin (the refractive index of 1.48 to 1.52) is used as the translucent cover 113, the refractive index may be adjusted to be 1.51.

The concave portion 113C of the translucent cover 113 is provided so as to cover the joint 20. Preferably, the concave portion 113C is provided so as to cover an end area of the display area 100A. It is desired that the entire width of the translucent cover 113 may be larger than the width ΔX of the joint 20, and smaller than the width of the liquid crystal panel 100.

As described above, the translucent cover 113 includes a portion in which the concave portion 113C is formed, and the plane portion 113P extending from the portion to the center side of the liquid crystal panel 100. The plane portion 113P is typically formed integrally with the portion in which the concave portion 113C is formed, so as to support this. In the case where the plane portion 113P is provided, it is possible to reduce the possibility to diversely affect the display in the display area since the surface is flat, and it is possible to suitably reinforce the joint 20.

The translucent cover 113 may have an arbitrary structure if the condition where the concave portion 113C is formed in a position corresponding to the joint 20 is satisfied. For example, the translucent cover 113 may have a shape having a slope which is gently inclined from the edge portion of the concave portion 113C to the side of the liquid crystal panel 100. If such a shape is adopted, the translucent cover 113 is disposed so as to selectively cover the joint 20. Accordingly, the material of the translucent cover 113 can be saved, and the weight can be reduced.

Together with the translucent cover 113 which selectively covers the joint 20, a translucent cover having a substantially flat-plate shape which covers the display area of the liquid crystal panel can be additionally used. With such a configuration, the quality of the image on the entire multi display can be improved, and since the components are separately prepared, the convenience in installation and disassembly can be enhanced when the display is temporarily performed.

In addition, as described above, when the liquid crystal panels are arranged by shifting them by half panel pitch in each row direction (or each column direction), the joint of the liquid crystal panels constitute T junction. As compared with the lattice-like panel arrangement having a crossroad junction, relatively high mechanical strength can be attained. In such a case, even if the size of the translucent cover 113 is decreased, it is possible to add sufficient strength to the joint, which leads to the cost down.

As a method for providing the translucent cover 113 on the liquid crystal panel 100, the concave portion is first provided in the translucent cover 113, and then the translucent cover 113 is stuck onto the liquid crystal panel 100. Alternatively, a translucent cover without any concave portion may be stuck first so as to cover the joint 20 of the liquid crystal panel 100, and then a desired concave portion 113C may be formed on the joint 20 by mechanical or chemical technique.

As described above, the translucent cover 113 is integrally formed in such a manner that the portion in which the concave portion 113C is formed partially overlaps with both of the adjacent panels, so that the joint 20 is reinforced, and the mechanical strength can be increased. In addition, in the portion of the translucent cover 113 interposed between the concave portion 113C and the liquid crystal panel 100, any interface which causes the change of refractive index does not exist, so that there does not occur such a problem that the joint 20 is noticeable due to the undesired reflection of external light.

In this embodiment, on the observer side of the translucent cover 113, an optical sheet 114 for low reflection or light scattering is disposed. By the optical sheet 114, a light diffusing layer or a reflection preventing layer is formed. It is noted that the optical sheet 114 may be provided as necessary, and may be omitted. Alternatively, instead of the provision of the optical sheet 114, the surface roughness of the translucent cover 113 may be appropriately regulated. In such a case, the light emitted from the liquid crystal panel 100 is scattered, thereby improving the viewing angle characteristics, and reducing the undesired reflection of external light.

Hereinafter, the advantage obtained by the provision of the concave portion 113C in the translucent cover 113 will be described. In the case where the concave portion 113C which functions as an optical lens is not formed in the translucent cover 113 (i.e., in the case where the surface of the translucent cover is uniformly planar), an image non-display area having a width of $\Delta X$ is generated in the joint 20 of the panels, as shown in FIG. 4. On the other hand, by the provision of the concave portion 113C functioning as an optical lens, the emitted light around the active area is bent, so as to be visually recognized as an image non-display area of $\Delta X'$ (where $\Delta X' < \Delta X$). That is, by providing the concave portion 113C, the light from the pixels in the peripheral portion of the display area 100A of the liquid crystal panel 100 is emitted to the front side of the panel also from the area corresponding to the boundary portion 20 of the translucent cover 113. The size of $\Delta X'$ is preferably reduced up to the size in which the angle of vision is equal to or lower than the resolving power of eyes depending on the observation distance of the multi panel 10.

Figure 5:
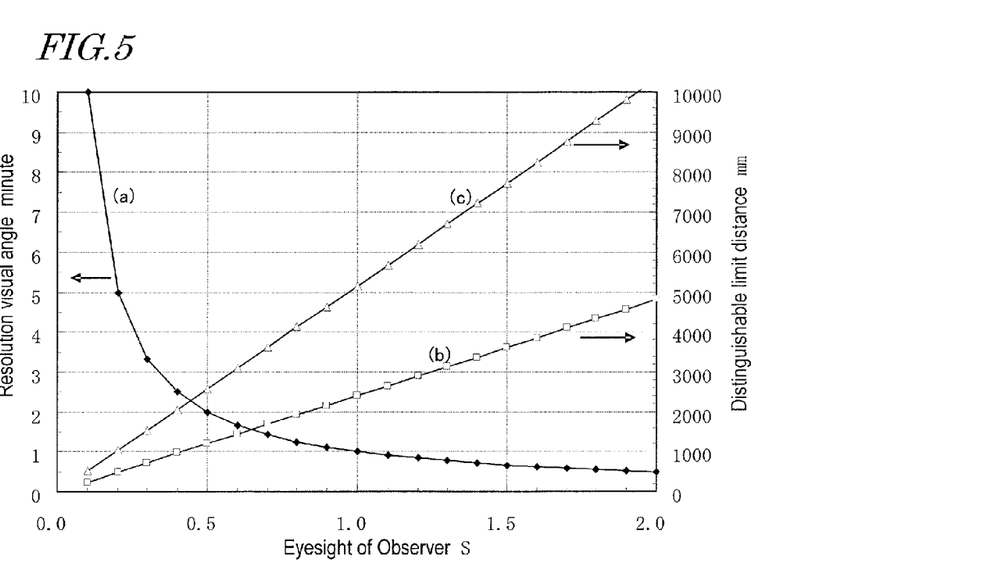
FIG. 5 is a diagram showing a relationship between the eyesight of an observer and a resolution visual angle, and a relationship between the eyesight of the observer and a distinguishable limit distance.

Herein the graph (a) shown in FIG. 5 represents resolution visual angle with respect to the eyesight, the graph (b) shown in FIG. 5 represents the distinguishable limit distance in the case of $\Delta X'=1.4$ mm, and the graph (c) shown in FIG. 5 represents the distinguishable limit distance in the case of $\Delta X'=3.0$ mm.

For example, in the case of the observer having the eyesight of 1.5, as is seen from the graph (a), the resolution visual angle is about 0.7 minutes. In addition, in the case where the width of the non-display area is $\Delta X'=1.4$ mm shown in the graph (b), for example, due to the optical lens effect of the concave portion 113C, it is found that the non-display area is visually recognized so as to be blended into the background image at the distance of about 3610 mm.

On the other hand, in the case where the translucent cover 113 is not subjected to any optical treatment in the boundary portion 20 (that is, in the case where the concave portion 113C is not formed in the translucent cover 113), and in the case shown in the graph (c) of $\Delta X=3.0$ mm, for example, the observer having the same eyesight as 1.5 cannot visually recognize the non-display area so as to be blended into the background image unless the observer is about 7735 mm or more away from the multi panel. As described above, the width of the non-display area is reduced by the optical lens effect, so that the image quality of the multi panel display can be improved.

(Embodiment 2)

Figure 6:
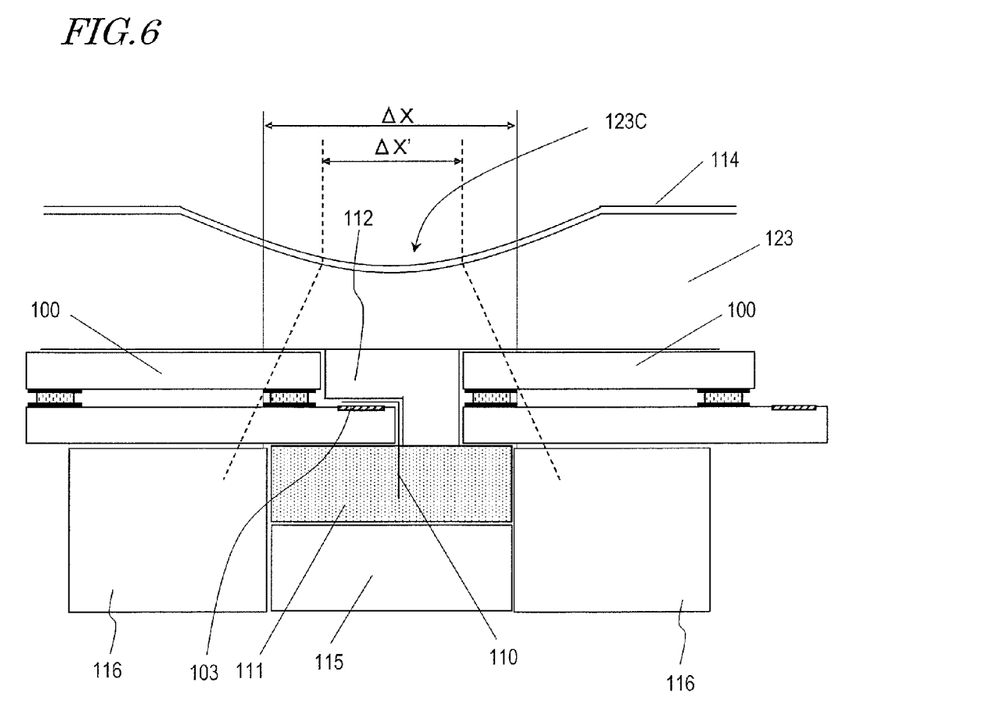
FIG. 6 is a sectional view showing the vicinity of a boundary portion of liquid crystal panels in an enlarged manner in a multi display system in Embodiment 2 of the present invention.

FIG. 6 is an enlarged view of the vicinity of the boundary portion 20 in the multi display system in Embodiment 2. Embodiment 2 has the same configuration as that of Embodiment 1 other than the use of a translucent cover 123. In other words, the configuration of the liquid crystal panel 100, and the arranging formation of the liquid crystal panels 100 are the same as those in Embodiment 1 described by way of FIG. 1 to FIG. 3. The same components as those in Embodiment 1 are designated by the same reference numerals and the descriptions thereof are omitted.

As shown in FIG. 6, in Embodiment 2, the translucent cover 123 is shaped in such a manner that the lens shape thereof is smoothly concave. The concave portion 123C of the translucent cover 123 has the shape defined by a smoothly curved surface, so that when the multi panel is viewed from a diagonal direction, it is possible to suppress that the connecting portion (the joint) is viewed as stripe-like form.

For example, when the display system is set up outdoors, light is incident on the display surface of the display device from various directions. When the multi panel display system provided with the translucent cover having the concave portion 113C defined by two slopes which form an obtuse angle, as shown in FIG. 4, is observed outdoors, there is a position in which the intensity of reflection light from the slope of the concave portion 113C is observed to be higher than the intensity of display light around the concave portion 113C, especially in the case of lower gray-scale display. At this time, the slope of the concave portion 113C is observed to be a stripe-like form, and the width of such stripe corresponds to the width of the slope constituting the concave portion 113C. On the other hand, when the translucent cover having the concave portion 123C defined by a smoothly curved surface, as shown in FIG. 6, is used, the width of the stripe to be observed can be reduced, so that it is difficult to visually observe the stripe.

In this way, by shaping the lens portion of the translucent cover so as to be smoothly concave, when the panel is viewed diagonally, the luminance variation of joint is smooth, the influence by the reflection of external light is reduced, and the joint is unnoticeable.

(Embodiment 3)

Figure 7:
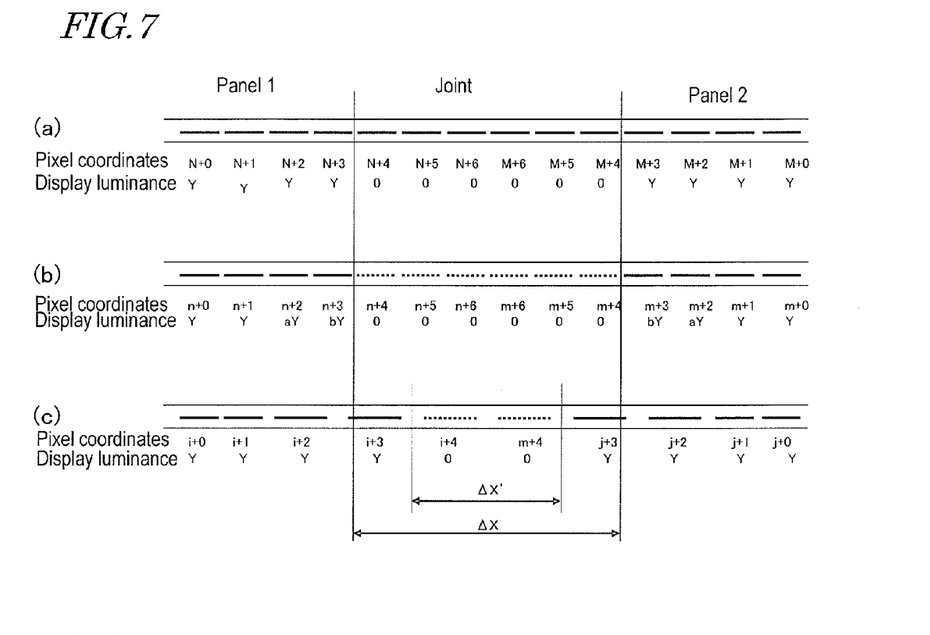
FIG. 7 is a diagram for illustrating image display modes in the vicinity of the joint of liquid crystal panels in Embodiment 3 of the present invention, in which (a) shows the mode in which a translucent cover in the embodiment is not provided, (b) shows the mode in which the translucent cover in the embodiment is provided and the luminance of pixels in an end portion is adjusted, and (c) shows the image condition which is actually observed by an observer.

In FIG. 7, (a) to (c) are diagrams showing image information and the like to be displayed in the joint of the liquid crystal panels (herein described as a panel 1 and a panel 2)

disposed adjacently in the multi display system. FIG. 7(a) shows the image display mode in accordance with a method in which the image information in the joint is thinned out. Herein the distance ΔX of the joint portion corresponds to the width of the non-display area. In FIG. 7(a), when it is assumed that an image to be displayed (a thinned-out image) exists in the position of the joint, it is regarded that the display with luminance of 0 is performed in the joint portion. Actually, the pixels exist in the positions of N+0 to N+3 in the panel 1, and in the positions of M+0 to M+3 in the panel 2. In the area, the actual display is performed. On the other hand, in virtual pixels in the positions of N+4 to N+6 and M+4 to M+6 in the joint, display is not performed, and the area is display as a black frame. This causes the quality of entire image to be degraded.

FIG. 7(b) shows the case where image display is performed with luminance of aY and luminance by in the pixels n+2 and n+3 of the panel 1 and in the pixels m+2 and m+3 of the panel 2, respectively. Herein, luminance Y is a standard luminance, and is a reference luminance when uniformly solid image is to be displayed, for example. In addition, coefficients a and b are luminance coefficients applied to the pixels in the vicinity of the joint, and are set based on the shape or the like of the optical lens (the concave portion) on the joint. The values of the coefficients a and b are adjusted so that the observer can see the image with uniform luminance Y when the observer views the display panel from the front. In addition, in these pixels, the image information applied to the pixels which do not perform display in FIG. 7(a) is distributed, and so-called interpolated image is displayed.

FIG. 7(c) shows the case where the observer views the display on the joint through the translucent cover in which the concave portion is formed as an optical lens. Virtual pixels i+2 and i+3 corresponding to the pixels n+2 and n+3 in FIG. 7(b), and virtual pixels j+2 and j+4 corresponding to the pixels m+2 and m+3 are seen as being expanded with the luminance Y. Accordingly, the observer can see the display as if the virtual pixels exist on the inside of the joint, so that the width of the black frame of the joint is observed as ΔX'.

As described above, the image information (a display signal) applied to the pixels in the vicinity of the joint is preferably image information which can interpolate the image to be originally displayed in the joint portion. For example, in FIG. 7(b), image information Grey(n+2) applied to the pixel n+2 of the panel 1 in the vicinity of the joint may be an averaged value of adjacent image information expressed by Grey(n+2)={Grey(N+2)+Grey(N+3)}/2 in the case represented by image information applied to a pixel shown in FIG. 7(a). Similarly, to the pixel n+3, such image information as Grey (n+3)={Grey(N+4)+Gery(N+5)}/2 is applied by using the image information to be displayed in the joint portion.

The image information applied to the pixels in the vicinity of the joint may utilize results of such operations as described above, and may be image information obtained by simply thinning out the data of the joint portion. The image around the joint is displayed by being expanded by the concave portion as the optical lens, so that the resolution of the image is reduced but the continuity of the image information via the joint can be maintained. In addition, the joint is viewed so as to have the width of ΔX' which is much thinner. As a result, the joint is seen as being blended into the image around the joint.

As described above, in this embodiment, the pixels around the joint (in the peripheral display area) of the display panel are caused to display interpolated image or the like of the image to be displayed in the joint portion, for example, or to display image expanded by utilizing the optical lens shape (the concave portion). In these ways, it is unnecessary to entirely enlarge the image of the display area, so that the display quality can be enhanced with relatively simple configuration. In the display area other than the vicinity of the joint, the optical lens for interpolating the image is not required. For this reason, it is sufficient to provide a transparent flat plate which can keep the continuity in luminance between the panel center portion and the joint portion adjacently to the translucent cover 113.

(Embodiment 4)

In the case where a plurality of large-size display panels are arranged in tiles, e.g. in the vertical direction, or other cases, the position of the joint of panels may sometimes be higher than the eye line. In such cases, the concave portion (the lens portion) of the translucent cover provided for the joint at the respective height may have a shape asymmetric with respect to the center of the panel boundary so that the joint is the most unnoticeable in an averaged gaze direction. In other words, in FIG. 8, the shapes of the lens portions positioned on the joints of the panels 100 are different depending on the heights hd1, hd2, and hd3 of the joints. Specifically, in the case of the optical lens shape shown in FIG. 4, the angles of inclination in the lens portion extending in the horizontal direction are asymmetric.

As for the installation of the multi panel, in any one of the arrangements of vertical expansion, horizontal expansion, curved expansion, dome-like expansion, and the like, the optical lens shape is selected so that the joint is the most unnoticeable in the average gaze direction (the observation direction) of the observer.

Figure 8:
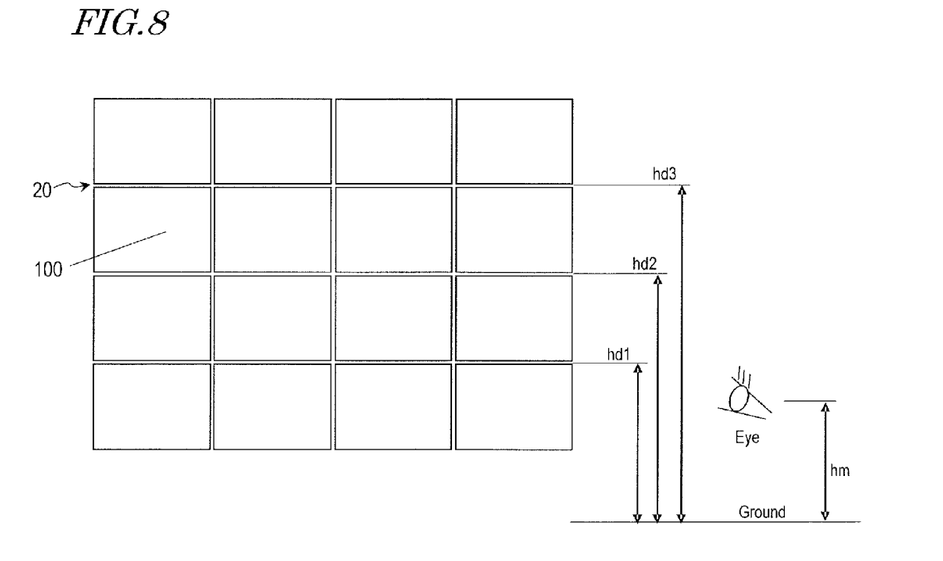
FIG. 8 is a diagram for illustrating the configuration of a multi display system in Embodiment 4 of the present invention.
Figure 9:
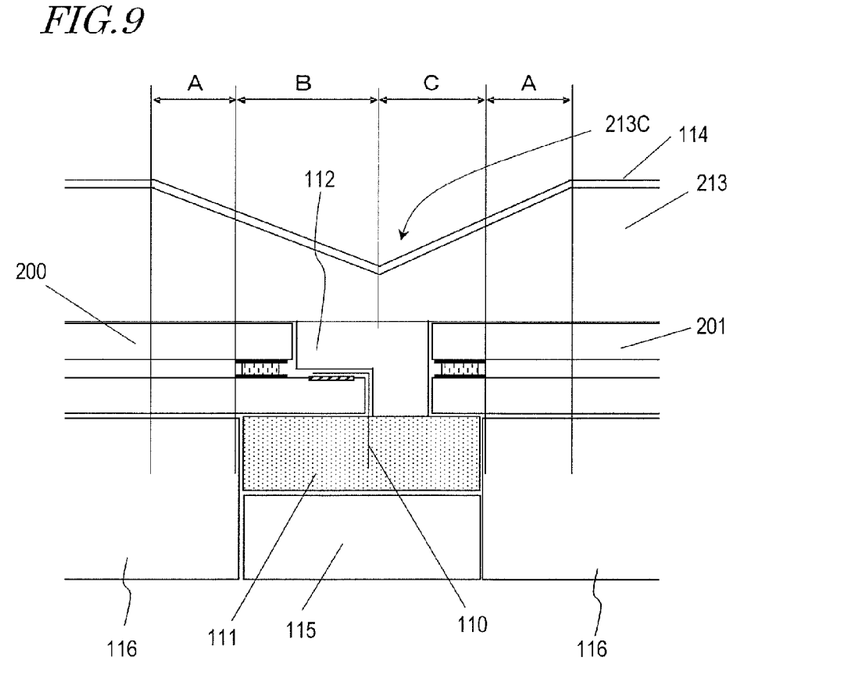
FIG. 9 is a sectional view showing the vicinity of a boundary portion of liquid crystal panels in an enlarged manner in the multi display system in Embodiment 4 of the present invention.

FIG. 9 shows the case where the angles of inclination in the concave portion 213C of the translucent cover 213 in this embodiment positioned in the joint portion are asymmetric between the panel 200 side and the panel 201 side. In addition, the lens portion exists even in the distance of A which covers the pixels around the joint (directly above the active area), and the relationship of B>C with respect to the center line of the joint (where B is on the ground side) is established. When viewed from the average viewpoint (in FIG. 8, shown by the height hm), if the height is hd1 (where hd1>hm) in FIG. 8, for example, in the lens portion disposed on the joint in the position, the relationship is B1>C1. At the height of hd2, the relationship is B2>C2, and at the height of hd3, the relationship is B3>C3. At these different heights, the lens portions are preferably disposed so as to satisfy the relationship of B1≥B2≥B3.

The concave portion 123C having a curved shape shown in FIG. 6 can be made to have an asymmetric shape by varying the curvature or the like. Also in the case where a translucent cover having such a concave portion is used, based on the above-described rules, it is sufficient to appropriately dispose concave portions having asymmetric shapes defined depending on the observation direction of the observer on respective joints.

In the case where the observation distance is relatively short, the observation directions (angles) are largely different with respect to the respective one of the multiple panels. This causes difference in visual performance depending on the position of the joint. Accordingly, by eliminating the difference as described above, the joint can be suitably unnoticeable.

(Embodiment 5)

Figure 10:
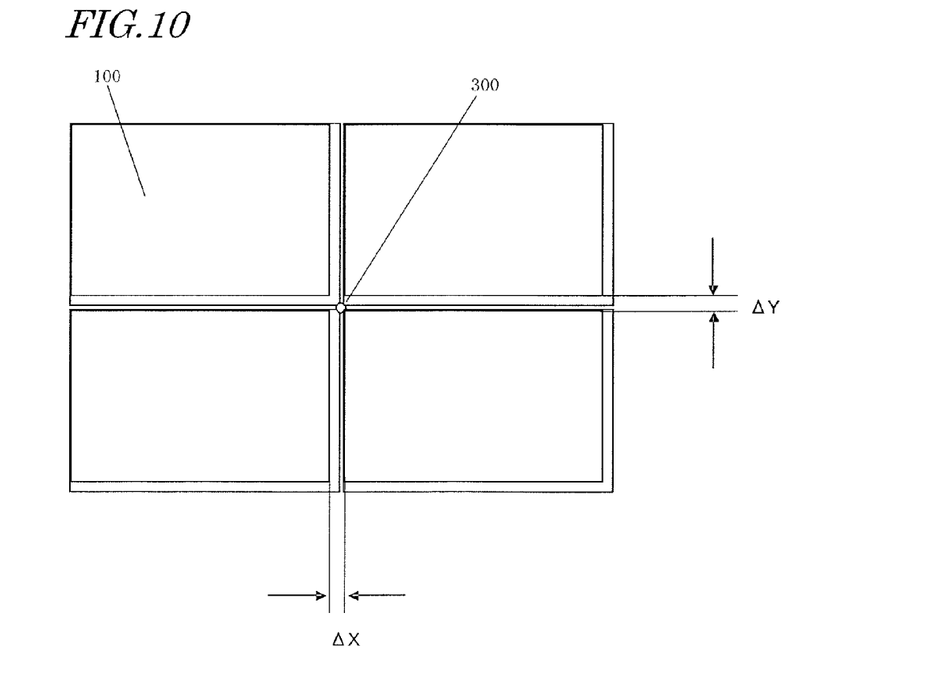
FIG. 10 is a diagram showing the configuration of a multi display system in Embodiment 5 of the present invention.

FIG. 10 shows a configuration in which an optical sensor 300 is disposed in the joint of the multi display system. The optical sensor 300 is, for example, a small CCD imaging unit configured by combining an optical fiber and a spherical lens. The optical sensor 300 is disposed in a joint corresponding to the crossing point of panels (a position in which the joints extending vertically and horizontally intersect).

In the case where a multi panel is configured by using a larger number of display panels, by means of the optical sensors 300 disposed in respective crossing positions, it is possible to perform the positional measurement or the gaze measurement of the observer. Based on the thus-obtained positional information of the observer, it is possible to provide the display of image contents and the interactive communication environment depending on the distance from the observer or the gaze direction.

Figure 11:
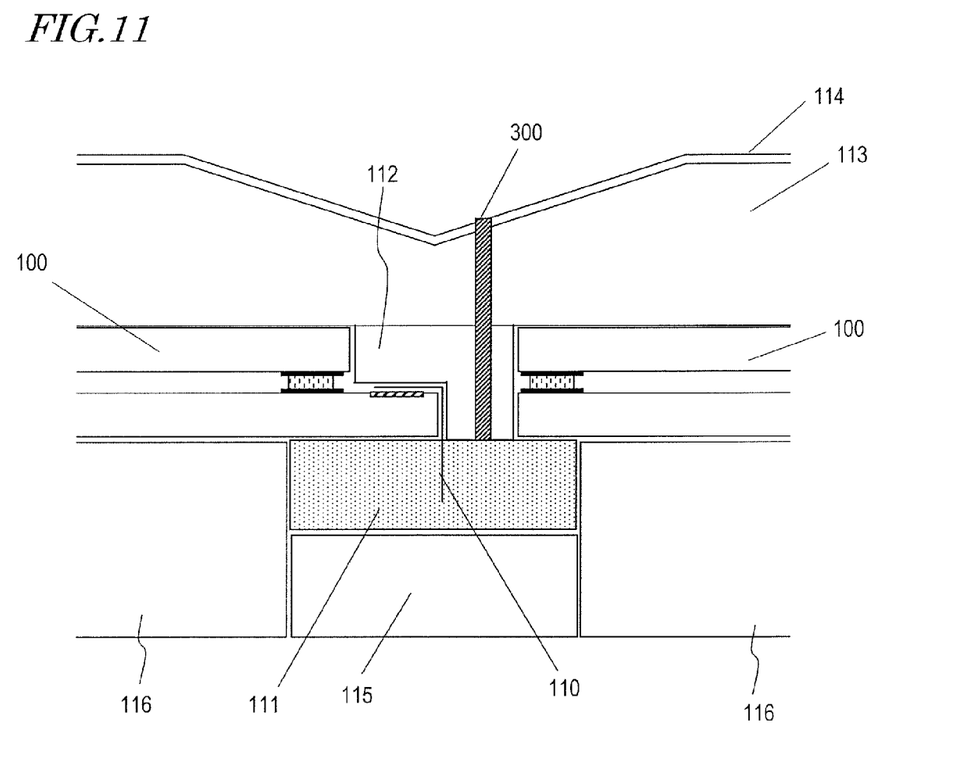
FIG. 11 is a sectional view showing the vicinity of a boundary portion of liquid crystal panels in an enlarged manner in the multi display system in Embodiment 5 of the present invention.

FIG. 11 shows a configuration of the joint of the multi panel in which the optical sensor 300 is provided. In the optical sensor 300, a light receiving portion thereof is configured by a micro lens, a fiber, or the like. The optical sensor 300 is connected to a connector portion 111 through a translucent cover 113 and a black mask 112. In the connector portion 111, an optical module such as a CCD chip is disposed, thereby imaging the received light. The received image signal is transmitted to an external control device via a wiring provided in the connector portion 111.

The circumference of a light guiding portion of the optical sensor 300 may be covered with a light shielding film for preventing the interference with the light emitted from the liquid crystal panel 100. The optical sensor 300 is not limited to a visual light sensor, but may be a sensor applied for infrared rays or ultraviolet rays.

The optical sensor disposed on the joint does not obstruct the image display, but enables the interactive communication with the observer. Accordingly, the optical sensor can be utilized for monitoring the weather, the people, and the traffic in the installation environment.

The multi display systems according to the embodiments of the present invention are described above, and the multi display systems in these embodiments have the following features. That is, by disposing the concave-shaped lens portion on the joint of respective panels so that the width of black frame is viewed to be narrower, it is possible to reduce the black frame caused as image disturbance to such a degree that the observer does not mind it. In addition, in one embodiment, when the multi panel image is displayed as a single panel image, the image information to be displayed originally in the frame area is distributed to pixels around the frame. Specifically, the image around the frame is expanded so that the frame is optically viewed to be narrower, and interpolation image information is output to the pixels around the frame. At this time, the image around the frame is expanded, so that the luminance distribution in the frame portion is spatially observed as being reduced. However, the image information is output in such a manner that the display luminance of the frame portion is higher than that of the frame center portion while the tone is entirely maintained for the pixels in the frame portion, so that the joint of respective panels in the multi panel is made unnoticeable. In addition, a cover constituted by a lens portion and a supporting portion is disposed so as to cover the joint of the panels, so that adjacent panels can be reinforced and supported. In this way, sufficient strength can be ensured.

As described above, the multi display systems in the embodiments of the present invention are described above. The display panel is not limited to the liquid crystal panel which is exemplarily described, but display panels such as an EL panel, an FED (Field Emission Display) panel, an electrophoresis display panel, and an LED display panel can be used. Alternatively, various types of display panels which perform other types of display such as reflecting type display or self-emitting type display can be used in the multi display system of the present invention.

Industrial Applicability

The present invention is suitably used as a multi display system constituting a large screen. The multi display systems according to the embodiments of the present invention are suitably used as a large screen display device for information display, digital signage, or the like.

REFERENCE SIGNS LIST

10 Multi display system
20 Joint (Boundary portion)
100 Liquid crystal panel
100A Display area (Active area),
100F Frame area
101 Counter substrate
102 TFT substrate
103 Connecting terminal
104 Sealing portion
105 Liquid crystal layer
106 Light shielding layer
108 Gate terminal
109 Source terminal
111 Connector portion
112 Black mask
113 Translucent cover
113C Concave portion
114 Optical sheet
115 Housing connecting portion
116 Backlight light guiding portion

The invention claimed is:

1. A multi display system comprising:
a plurality of display panels which are disposed adjacently to each other via a boundary portion; and
a translucent cover provided on the plurality of display panels, to cover the boundary portion and overlapping with both of the plurality of display panels which are disposed adjacently to each other; wherein
the translucent cover is defined by a supporting portion which covers a part of the display panel other than the boundary portion, and a portion continuous to the supporting portion, the portion continuous to the supporting portion having a concave portion defined on an observer side in a position facing the boundary portion, the translucent cover being directly attached to a surface of the part of the display panel such that there is no empty space between the translucent cover and the surface of the part of the display panel;
each of the plurality of display panels includes a display area which contributes to display and a frame area provided around the display area;
the concave portion covers at least part of the display area;
a width of the translucent cover in a direction perpendicular to an extending direction of the boundary portion and parallel to the surface of the part of the display panel is larger than a width of the boundary portion perpendicular to the extending direction of the boundary portion and smaller than a width of the display panel perpendicular to the extending direction of the boundary portion; and
the concave portion has an asymmetric shape in the boundary portion;
wherein the boundary portion includes the frame area of each of the adjacent display panels, and part of light emitted from the display panel is emitted from an area corresponding to the boundary portion of the translucent cover in the concave portion.

2. The multi display system of claim 1, further comprising a light diffusing layer or a reflection preventing layer formed on the translucent cover.

3. The multi display system of claim 1, wherein the concave portion has a surface defined by two planes which are not parallel to each other.

4. A multi display system comprising:
a plurality of display panels which are disposed adjacently to each other via a boundary portion; and
a translucent cover provided on the plurality of display panels, to cover the boundary portion and overlapping with both of the plurality of display panels which are disposed adjacently to each other; wherein
the translucent cover is defined by a supporting portion which covers at least part of the display panel other than the boundary portion, and a portion continuous to the supporting portion, the portion continuous to the supporting portion having a concave portion defined on an observer side in a position facing the boundary portion;
the concave portion has a single continuous concave curved surface which covers the display areas of the plurality of display panels and the boundary portion; and
the concave portion has an asymmetric shape in the boundary portion;
each of the plurality of display panels includes a display area which contributes to display and a frame area provided around the display area; wherein the boundary portion includes the frame area of each of the adjacent display panels, and part of light emitted from the display panel is emitted from an area corresponding to the boundary portion of the translucent cover in the concave portion.

5. The multi display system of claim 1, wherein the display panel has a plurality of pixels, and a display signal based on the information of image to be displayed in the boundary portion is applied to pixels that are closer to the boundary portion.

6. The multi display system of claim 1, wherein the shape of the concave portion is defined depending on an observation direction of the observer.

7. The multi display system of claim 1, wherein an optical sensor is provided in the boundary portion.

8. The multi display system of claim 1, wherein the concave portion covers both the display areas and the frame areas of the plurality of display panels.

* * * * *